G. KENDALL.
Candle Mold.
No. 9,696.
3 Sheets—Sheet 1.
Patented May 3, 1853.
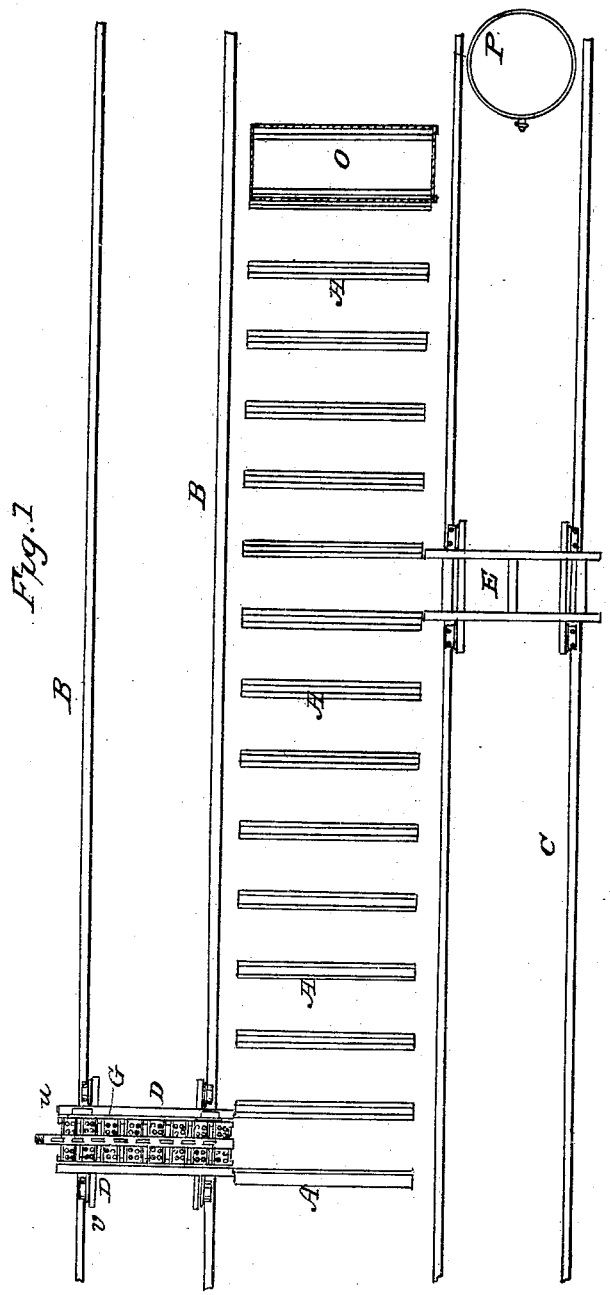

G. KENDALL.
Candle Mold.
No. 9,696.
3 Sheets—Sheet 2.
Patented May 3, 1853.
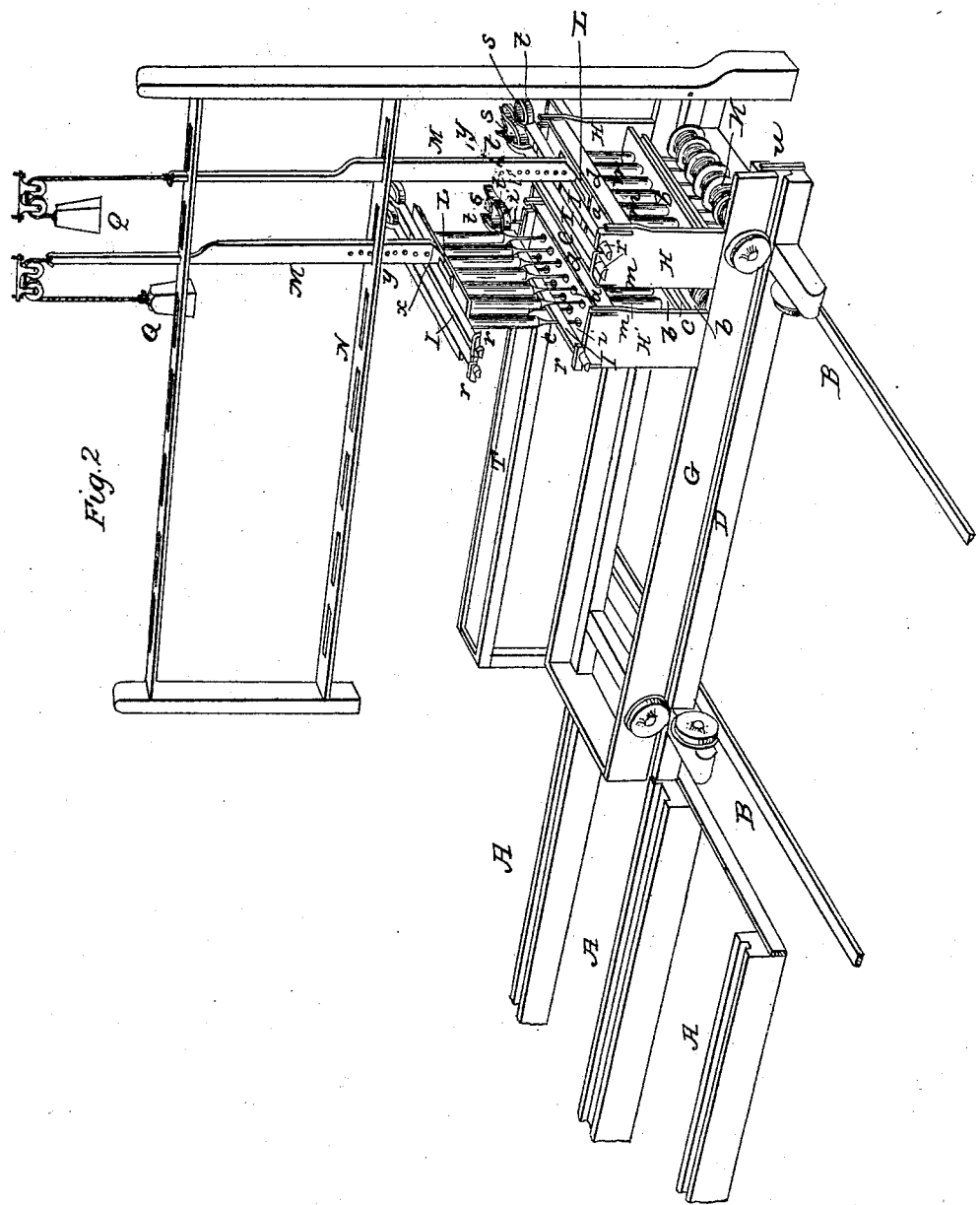

G. KENDALL.
Candle Mold.
No. 9,696.
3 Sheets—Sheet 3.
Patented May 3, 1853.
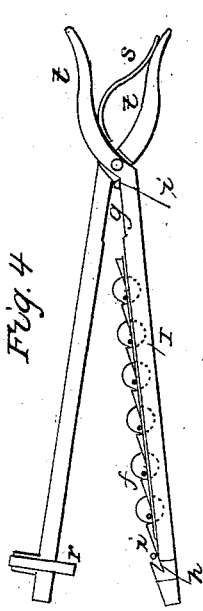
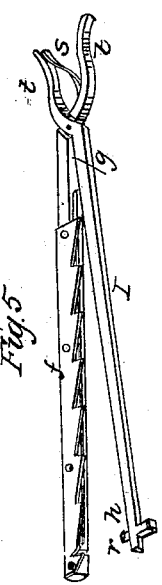
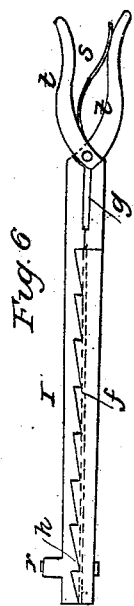
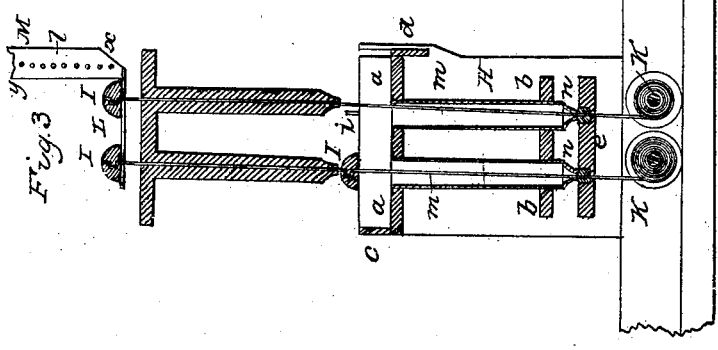

UNITED STATES PATENT OFFICE.

GEO. KENDALL, OF PROVIDENCE, RHODE ISLAND.

MOLD CANDLE APPARATUS.

Specification of Letters Patent No. 9,696, dated May 3, 1853.

*To all whom it may concern:*

Be it known that I, GEORGE KENDALL, of the city and county of Providence and State of Rhode Island, have invented certain new and useful Improvements in the Manufacture of Candles, of which the following is a full, clear, and exact description, reference being had to the accompanying drawings, which make part of this specification, and in which—

Figure 1 represents a plan of my improved molding apparatus, including the railways, cars, oven for heating the molds, pot for melting the fat, the molds, and apparatus for drawing the candles therefrom. Fig. 2, represents a view in perspective of an apparatus for molding and drawing the candles and supplying and centering fresh wick in the molds. Fig. 3 is a vertical transverse section through one of the mold frames, showing the candles drawn from the molds. Fig. 4 is a top view of one row of molds, showing the clamp in place ready to center the wicks. Fig. 5 is a view in perspective of a centering gage and its clamp, turned bottom side uppermost, by means of which the wicks are centered in the molds, and so firmly gripped that the candles when set can be drawn by it. Fig. 6 is a plan of the centering and drawing clamp inverted and closed.

The main object of my invention is to diminish the manual labor and expense of molding candles, and to perform many of the nicer parts of the operation automatically, thereby rendering it in a great measure independent of the skill of workmen.

The first part of my invention consists of an arrangement of cars and railways, by means of which the molds are run when empty to the oven to be heated, thence to the vessel containing the melted fat by which they are to be filled, thence to a stand to remain until the fat is set, thence to the apparatus by which the candles are drawn out of the molds and a fresh supply of wick drawn in.

The next part of my invention consists of an apparatus for drawing the candles from the molds and is large enough to draw all the molds of a car, at the same time and is so placed and arranged with respect to the railway, that any number of cars may be brought up to it in succession to have the candles drawn from their molds and the latter rewicked ready for the reception of another charge of fat.

The next part of my invention relates to the mold and consists in fitting the tip or lower end thereof with an elastic cap perforated with a hole made sufficiently small to embrace the wick tightly so that an amount of force is required to pull the wick through, sufficient to stretch and straighten it in the mold, while at the same time the escape of fat is effectually prevented.

The next part of my invention consists in mounting the spools of wick, and a series of stands of molds upon a car, in such manner that the whole are carried about from place to place during the various operations, in their proper relative order, thereby avoiding the derangements and readjustments that become necessary when the molds are worked in the usual manner.

The next part of my invention relates to the centering of the wicks in the molds, and consists, in extending the wicks through the molds from the tips or lower ends thereof, toward one side of their upper ends in such manner, that the centering apparatus will be sure to act properly upon each wick.

The last part of my invention consists of an apparatus for drawing the candles from the molds and for centering the new wicks therein, preparatory to the introduction of the melted fat, whereby the operation of drawing a whole stand of candles is effected as expeditiously and readily as the drawing of a single candle, and the centering of the wicks of a row of molds is effected with greater expedition and accuracy than the wick of a single mold could be centered by the eye and hand of even the most skilful workman.

The operation of molding candles by my improved method involves the expenditure of but little labor, as the candle molds are carried about from place to place as required on cars, which run on cross railways laid down on the floor of the molding room. The molds are mounted upon cars, each of which carries several dozens, and they are heated to about the temperature of the melted fat with which they are to be filled, by running the car into an oven; after the molds are thus heated they are carried by the car to a caldron containing the melted fat, and filled therewith. The car is then run to one of the empty tracks and permitted to stand until the candles are cooled, when it is moved to an apparatus by the aid of which the candles are drawn and the molds rewicked ready to be again heated and filled. To facilitate the transference of the molds to different parts of the room, the cars on which they are mounted, are carried about on trucks fitted with rails at right angles to the track on which they run, so that the car with the molds can be carried forward or back by the truck, and run to the right or left on its own wheels upon lateral tracks as may be required.

The accompanying drawings represent a series of railways (A) of the length of a car for the purpose of receiving the cars after their molds are filled, and permitting them to stand until the fat therein sets, or for the passage of cars to, and fro, from the tracks (B and C) which are at right angles to the tracks (A) and at either end of them. The short tracks (A) are on a higher level than the long tracks (B and C), so that the rails on the trucks (D and E) which run on the latter tracks may be on a level with, and form a continuation of any of the tracks (A) when placed opposite the same by the movement of the trucks.

Upon the truck (D) is represented a car (G) with two stands (H H′) of molds (M) thereon, from one of which the candles are drawn, and in one row of the molds the new wicks are centered by one of the clamps (I), the other row of wicks being ready to be centered and clamped by means of another clamp.

The remainder of the stands of the car are not shown in the drawing, but they are supposed to have the candles drawn from their molds, and new wicks centered and clamped in place. When all the candles are drawn and the wicks of each row of molds on a car have been centered and clamped, a knife is passed along the top of each clamp to separate the wicks of the drawn candles from the newly clamped wicks in the molds below. The whole of the molds on the car being thus rewicked and the centered wicks separated from the drawn candles, the truck is run back until opposite an empty track (A) when the car with its wicked molds, is run across to the truck (E) on the track (C). The truck (E) is then run along until the car (G) is brought opposite the oven (O) when the car is run therein to have its molds heated to the proper temperature to receive the melted fat. After the molds are heated, the car is run out of the oven upon the truck (E) and carried by the latter to a melting pot (P) containing the fat, which is run from suitable stop-cocks into the molds, or ladled therein, as may be deemed advisable. This being done the truck is run opposite an empty track (A), and the car is run thereon to rest until the fat is set in its molds, when, it is ready to be run up to the apparatus for drawing its candles, and rewicking its molds.

While the molds of one car are being heated and filled, and standing on the track for its candles to cool, the operation of drawing, rewicking, and refilling other molds is going on, so that if the number of tracks, trucks, and molds, be sufficient the operation may be continuous, as the cars would have their molds filled and drawn in endless succession without any greater interruption than is requisite for changing from one car to another.

The stands (H) for the molds are firmly secured to the cars, and the molds, to the number of say twelve, are firmly secured in each stand in an upright position and at equal distances apart, in horizontal boards (a b) placed about two thirds of the length of the molds apart in the upper portion of the stand frame. The uppermost (a) of the horizontal boards is placed an inch more or less below the top of the stand and has a fixed ledge (c) fastened on its rear edge, and a sliding ledge (d) that can be moved up or down is fitted to its front edge. When this front ledge is up, the two ledges and the ends of the stand form a tray into which the upper ends of the molds open so that when the fat is poured into it, all the molds of the stand will be filled at once.

Preparatory to withdrawing the candles from the molds, the cake of fat which fills the tray must be loosened, this is done by pressing down the movable ledge (d) and jarring the fat by a knock with the hand which renders it sufficiently loose.

The lower ends or tips (n) of the molds (m) rest in this instance upon pieces of vulcanized india rubber (o) let into the lower crossbar (e) of the stands (H). Each of these pieces of india-rubber is pierced with a hole somewhat smaller than the wick, and as the wick is passed through this hole the latter compresses it so tightly as to prevent the fat from leaking out. In like manner leakage is prevented between the bottom or tip of the mold, and the rubber, by the pressure of the former upon the latter.

The spools (K) hold wick enough to supply the molds for several months. The end of each wick is passed from the spool up through the india-rubber, into the mold, and through the latter, to the jaws of a clamp (I) above, by which it is firmly grasped. All the wicks of each row of molds in the stand are secured in one of these clamps.

When the molds are filled and the fat therein has set, or become sufficiently cool, the candles are drawn by lifting their clamps, and as the wicks extend down through the candles to the spools the act of drawing a candle out of the mold draws a fresh supply of wick therein, and as a gage or stop is provided for limiting the height to which the candles are raised precisely the proper quantity of wick to supply the molds, and leave a snuff on the candle, will be drawn from the spools. The candles after being drawn are moved a little to one side, as seen in Figs. (3 and 4) by the movement of the lifter in order to incline the wicks in the molds, that the notches of the gage plate of each clamp may be certain to catch and center the wicks, for if the wicks should happen to incline some one way and some another, there would be no certainty of centering them, and an imperfect candle would of course be the result.

When the candles have been drawn by raising one clamp, another must be ready to apply to the wicks between the tops of the molds and tips or lower ends of the candles, as seen in Fig. (2).

It will be observed that one of the jaws of the clamp (I), is provided with a plate (f) having a series of inclined teeth or notches in it, corresponding in number to the wicks it is designed to clamp. It will also be observed that at the inner end of the clamp, a narrow slot (g) Figs. (4 5 and 6) is formed between the jaws, and at the outer ends, a round hole (h) is formed between the jaws when closed. It will also be observed that two pins (i) project up from the ends of the stands in a line with the center of each row of molds.

Now by applying the clamp as seen in Fig. (4) in such manner that the toothed jaw will rest against the pins (i) and pushing it as far across the stand as the slot (g) and pin (i) will allow, and then drawing it back, each tooth or notch catches a wick and moves it along until the hole (h) in the front end of the clamp is brought against the pin (i) when every wick will be centered in its mold, the outer jaw of the clamp is now shut upon the toothed jaw without moving the latter, and the two are held together by a spring catch (r). In order that the clamp may hold the wicks with equal firmness throughout its entire length, the adjacent sides of its jaws are made convex in the direction of their length, and one of them has a tongue or rib, and the other a corresponding groove, so that the wick in being clamped may be kinked by the groove and rib, and prevented from drawing out, which is highly important as the pulling of the candles from the molds requires a considerable amount of force, which would draw the wicks from smooth jaws before the candles would rise.

The front extremities of the jaws of the clamp are held together when closed, by the spring catch or hook (r), and when this catch is unfastened, the jaws are thrown open by a spring (s), between the handles (t). The jaws of the clamp are pivoted together in the manner of pincers, and the joint should be firm and strong, as the first operation preparatory to drawing the candles from the molds, is to loosen them by rolling the clamp slightly by its handles, which can only be done by applying considerable force. The jaws of the clamps I prefer to make of cast iron for cheapness and convenience, but they may be made of any other suitable material. The molds (m) are made of metal in the usual manner, and are fixed in the stands in the same way it is common to fix others.

The lifting of the clamps to draw the candles from the molds is effected by means of flat hooks (L) affixed to upright bars (M) that slide up and down in guide mortises in a frame (N), and which when raised, are counterbalanced by a weight (Q) that preponderates sufficiently over the weight of the bars with the clamp and candles hanging upon it, to keep them elevated. The flat hook (L) at the bottom of the bar is introduced beneath both the clamps of each stand, so as to draw all the candles of a stand simultaneously; the bar has sufficient play in the guide mortises to allow it to be swung back far enough to enter the hooks (L) beneath the clamps (I, I). This bar is struck by the hand of the attendant a smart blow upon the beveled corner (x) of its lower end, and at the same time lifted by the other hand, for the purpose of starting the candles out of the molds, this is usually found to be sufficient, but if the candles should still remain in the molds, a repetition of the knocking with one hand on the lower end of the bar, and of the lifting with the other, must be resorted to, which will prove in every case sufficient. Just as the bar approaches the limit of its upward motion an adjustable inclined plane (y) on one of its edges strikes against the end of the guide mortise which deflects it far enough to throw the wicks to one side of the molds to insure the proper action upon them, of the centering notches of the clamp, as before mentioned.

The upward movement of the lifting bars (M) is determined by a pin (l) which is passed into a higher or lower hole in the bar, as it is required to raise the bar more or less. In this way the same lifting bars are adapted to the drawing of candles of various lengths.

When the candles have been drawn from the molds of all the stands of a car, and the new wicks have been centered, the drawn candles are separated from the wicks by passing a sharp knife along the top of the lower clamps. The candles are then taken from the hooks (L) and laid in a table, or shallow tray (T) where they are separated from the cake of fat cast with them, by means of a knife. The candles thus separated are removed to a suitable receptacle, and the cake of fat and other trimmings are thrown into the melting pot to be again melted and cast.

The cars (G) are all of the same size and contain an equal number of stands of molds which are all of the same size and arranged in exactly the same relative position on each car, in order that when the cars are run against the stop (u) on the truck (D) and the latter is run against the stop (v) on the track (B) under the frame (N) the clamps (I) may always be exactly in the proper position to be drawn by the hooks (L).

The several improvements which I have specified may be greatly modified without the least departure from the principle of my invention; as for example, I have mentioned vulcanized india-rubber, for the purpose of rendering the lower end of the mold, through which the wick enters, elastic, because it is the substance I have tried and found to answer the purpose well; but I claim the right to use for this purpose any yielding or elastic substance or contrivance whatsoever, such as felt, leather, cork, or elastic packing of any kind, or two or more pieces of wood, metal, or other rigid substance pressed toward each other to embrace the wick tightly, and also to press against the lower end of the mold, so as to prevent the leakage of the fat, and to retard the passage of the wick so as to require it to be pulled hard enough to stretch it tightly to draw it into the wick.

The jaws of the clamps may be varied in construction and arrangement with reference to either of the functions which they have to perform to any extent; and instead of combining the centering and clamping functions in the same instrument there may be a separate instrument for each, the form I have described however I believe to be the best. So also the arrangement of the railway tracks, and the construction and arrangement of the apparatus for drawing the candles, and the oven for heating the molds, may be indefinitely varied, to adapt them to particular circumstances, or to suit the particular views of different constructors, changes of this kind are however too obvious to render a detailed description of them necessary and I have therefore omitted it.

Having thus described my improvements and indicated a few of the many modifications of which they are susceptible, what I claim therein as new and desire to secure by Letters Patent, is —

1. The arrangement of the traveling and fixed railways on which the molds are transferred from place to place as required in the process of casting candles as herein described, in combination with an oven for heating the molds, a melting pot to prepare the fat for casting, and apparatus for drawing the candles from the molds, substantially as herein set forth.

2. In combination with a series of moving stands of molds I claim the counterpoised hooks or the equivalent thereof, arranged and operating as herein set forth to aid in drawing the candles and centering the wick in such manner as to dispense with much of the care and skill heretofore required for the performance of this operation.

3. I claim an elastic or a yielding cap for the lower end or tip of the molds which performs the two functions of stopper, and friction-brake to stretch the wick substantially as herein set forth.

4. I claim the wick clamp, constructed and operating as herein set forth.

In testimony whereof I have hereunto subscribed my name.

GEORGE KENDALL.

Witnesses:
P. H. WATSON,
A. E. H. JOHNSON.